Aug. 2, 1966 W. H. AUSTIN 3,264,627
ELECTRICAL WARNING CIRCUIT
Filed Nov. 19, 1962

Inventor.
William H. Austin,
By Hofgren, Brady, Wegner,
Allen & Stellman
Attorneys.

United States Patent Office 3,264,627
Patented August 2, 1966

---

3,264,627
ELECTRICAL WARNING CIRCUIT
William H. Austin, 1622 S. Karlov Ave., Chicago, Ill.
Filed Nov. 19, 1962, Ser. No. 238,527
1 Claim. (Cl. 340—220)

This invention relates to a signaling device and more specifically to an electrical warning circuit which provides an indication of change of conditions when there is an interruption of current flow.

A variety of protective circuits have been provided in the past which provide different types of protection depending upon the characteristics and requirements of the conditions within which they operate. Of course, an example of this would be the fuse which is normally provided in so many electrical appliances to burn out under certain types of load conditions such as a heavy current flow beyond design characteristics for a predetermined period of time. Another type of protective device is a circuit breaker, again, a device operating on the principle of opening the circuit when heavy overloads of current flow. It would be desirable in many applications to have an indication of the condition these various protective circuits are in.

It is an object of this invention to provide an improved electrical warning circuit.

It is a further object of this invention to provide an electrical warning circuit which gives indications of circuit problems when current flow is interrupted.

It is yet a further object of this invention to provide an electrical warning circuit wherein an indication of circuit interruption is provided for both the item to be protected and for the power circuit itself.

It is still a further object of this invention to provide an electrical warning device, which is readily portable, and adapted to be placed in many environments which will provide signaling protection to the item to be protected.

Accordingly, one feature of this invention is to provide an electrical warning circuit comprising: means for connecting the circuit to a source of alternating current potential; means, coupled to the connecting means, for rectifying the potential to develop a direct current output; a signaling circuit including a first series circuit having a source of direct current potential, a signaling device and a switch for applying the direct potential source to the device; and a second series circuit, coupled across the output, including a relay for actuating the switch and at least one sensing device for interrupting current flow through the relay when a given condition is sensed by the device.

It is a further feature of this invention to provide an electrical warning circuit including a means for indicating the application of potential to the circuit.

It is yet a further feature of the invention to provide in an electrical warning circuit a second series circuit which can be interrupted by a key for disabling the circuit when desired.

It is yet a further feature of this invention to provide a plurality of sensing means in series with a relay coil which is energized from a source of alternating current so that a plurality of sensing stations may actuate a single signaling device for indication of current interruption.

Further objects and features will become apparent from the following detailed description taken in connection with the accompanying drawings, wherein.

Figure 1:
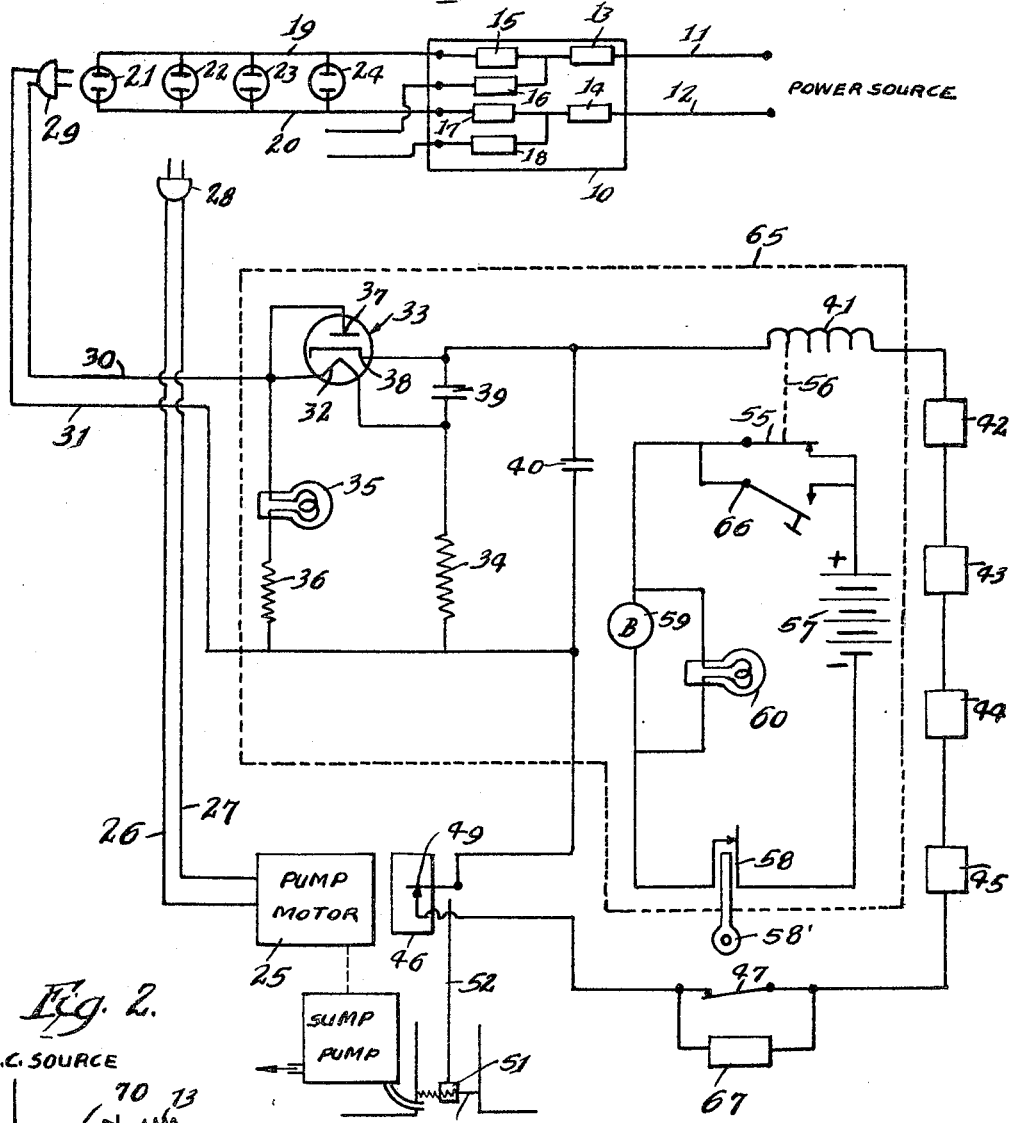
FIGURE 1 shows one embodiment of the invention.
Figure 2:
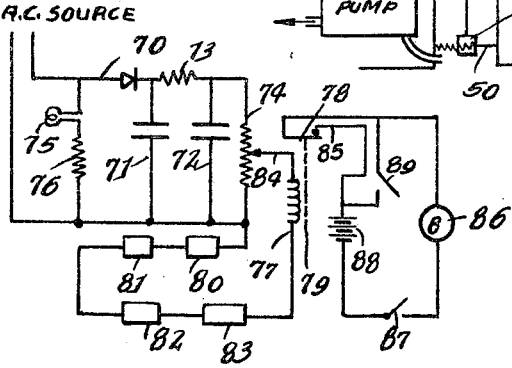
FIGURE 2 shows a second embodiment of the invention.

Referring now to FIGURE 1, there is shown a power source for supplying electrical power to a pump motor. One extremely advantageous use of the electrical warning device, as disclosed in this application, is the incorporation, within homes already in existence, of electrical warning devices and circuits where they are not already incorporated or where they are insufficient.

In the drawing, a main power distribution panel 10 is shown coupled via leads 11 and 12 to a power source (not shown) and represents a usual home installation. A pair of main fuses 13, 14 fuse the entire power distribution system of the home, and individual circuits are provided with individual fuses 15, 16, 17 and 18, which provide for additional protection. One such circuit is shown including leads 19 and 20 having a plurality of female plugs 21, 22, 23 and 24 coupled thereto. Normally, various electrical devices would be coupled to the various plugs 21–24 to provide different operations. One such appliance is shown which includes a pump motor 25 coupled by leads 26, 27 to a male plug 28, schematically shown and not inserted in plug 22. In this instance, the pump motor drives a sump pump 25' for removing excess water in the basement of the home. Therefore, under normal operating circumstances, plug 28 would be inserted in plug 22 to supply power to the pump motor in the event that it is needed.

An electrical warning circuit is provided for the pump motor and is coupled via plug 29 and leads 30, 31 to the circuit coupled to fuses 15, 17.

Lead 30 is coupled to one side of a heater 32 of a tube 33. An indicating circuit including a lamp 35 and a dropping resistor 36 are coupled in series between lines 30 and 31 to indicate when the power is applied to the protective circuit. The lamp may be located in the immediate vicinity of the control device to show that it is plugged in and receiving power.

The plate 37 of tube 33 is coupled to the heater 32, and a capacitor 39 is connected between the cathode 38, and resistor 34. A capacitor 40 is connected between cathode 38 and line 31 serving as a filtering capacitor for the tube 33 which acts as a rectifier.

A series circuit including a relay coil 41, a plurality of protective devices 42, 43, 44, 45 and 46, and a switch 47 is connected in parallel with capacitor 40. The devices 42–45 are shown in block form and may be a variety of protective devices such as bimetallic strips, fuses, etc. The only requirement for the devices being that when an undesirable condition exists adjacent to or coupled with the electrical signaling device, current flow is interrupted through the device. Thus, device 46, adjacent the pump motor of the sump pump, is shown as a float actuated switch 49. The water level 50 in the sewer system is shown supporting a float 51 which drives rod 52 in an upward direction in the event that the sump pump is not operating and there is a rising level of water in the sewer system. When a predetermined level is reached, rod 52 will open, switch 49 interrupting current flow through the electrical signaling circuit.

Relay 41 is shown actuating a switch 55 by dashed line 56. When there is no current flowing hrough coil 41, switch 55 is normally closed (as shown). A signaling circuit is connected to switch 55 and includes a battery 57, a key-actuated switch 58, and a parallel circuit including a buzzer 59 and a light 60. Although buzzer 59 and light 60 are shown, it is to be understood that only one device is necessary for indicating the condition of no current flow through the electrical signaling circuit. Key-actuated switch 58 is provided for de-energizing or opening the series circuit when the plug 29 is removed from the circuit, and the device is carried from one place to another if it is desirable that the systems be inoperative for some reason.

The operation of the electrical warning circuit is as follows. The items enclosed by dashed line 65 are mounted within a box which is easily portable and designed to be installed in a variety of locations. Normally, it would be mounted adjacent an outlet such as 21 in a convenient, dry place. In the operation as discussed, it may be mounted in the basement of the home near the electrical inlets to the home.

Plug 29 is inserted in a suitable receptacle 21 and power is applied to the electrical warning circuit. Alternating half cycles of the alternating current are rectified by tube 33, and a direct current potential is developed and applied across the sensing circuit including relay 41, devices 42–46, and switch 47. Switch 55 is opened when relay 41 is energized, and key 58 is removed, thus closing the contacts of switch 58. It should be noted that a switch 66 is provided in parallel with the switch 55 for manually testing the circuit by applying the battery 57 potential across the buzzer 59 and light 60. The electrical warning circuit is now in operation and is ready to sense the failure in the several places in the home.

For instance, should the power source, coupled to lines 11 and 12, fail, power is removed from the lines 30, 31, there is no potential for tube 33 to rectify and relay 41 ceases to have current flowing therethrough; switch 55 is closed by the arm 56 and battery potential is applied across the buzzer causing it to sound. In addition, the light, which may be located remotely from the protective device, will light.

If the fuses 13, 14, 15 and 17, or any of them, burn out due to excessive current flow, a similar operating condition exists and the relay will cause buzzer 59 to be actuated and to light light 60. Thus, the electrical warning circuit indicates power failure to the circuit of pump motor 25.

In the event that the pump motor does not operate for one reason or another, or that the sump pump does not function properly, even though the pump motor is operating, the water level 50 will rise in the drainage system. Arm 52 opens switch 49 interrupting the current path for current flow through relay 41 which closes the switch 55 causing buzzer 59 to sound.

Devices 42–45 may be positioned to sense other conditions throughout the home. Any of the devices is capable of interrupting the current flow through relay 41, resulting in a visual and audio signaling of electrical problems.

It should be noted that protective device 67 coupled across switch 47 is shown to indicate that additional protective devices may be located in the circuit of the protective device, and in the event that they should be, switch 47 would be opened allowing the current to flow through such devices.

If the heater 32 should burn out due to a faulty tube, long use or any other reason, current is interrupted to the relay 41 and switch 55 is closed.

A second embodiment of the invention is shown utilizing a diode 70 and a filtering network including capacitors 71, 72 and a resistor 73 for providing a direct current potential across a resistor 74. An indicator circuit, including lamp 75 and resistor 76, is connected across the input terminals to the diode and filtering network and shows when the alternating current source provides potential to the circuit. A relay 77, actuating a switch arm 78 through a mechanical coupling indicated as dashed line 79, is connected to a series of protective devices 80, 81, 82 and 83 to one side of resistor 74 and through the variable tap 84 to a point on resistor 74. Thus, there is provided a circuit for energizing the relay 79 to open switch 78 which may be interrupted by the actuation of any of the protective devices 80, 81, 82 and 83.

When relay 79 is actuated, arm 78 is kept away from the contact 85 and no potential is applied to buzzer 86. A switch 87 is provided for interrupting potential from a battery 88 being applied to buzzer 86 during installation of the alarm system. A switch 89 is provided coupled in parallel with the switch arm 78 and contact 85 which, when closed, provides a path for current to buzzer 86 and serves as a test switch.

I claim:

Electrical warning means adapted to be connected to an alternating current potential source, comprising: a sensing circuit including, means connectable to said alternating current source for rectifying and filtering said alternating current potential to produce thereby a direct current potential output, a relay having a direct current coil connected in series with said rectifying and filtering means, a plurality of condition monitoring devices, each having a normally closed electrical switch connected in series with said rectifying and filtering means and means for sensing the existence of an undesired condition for opening said switch when the undesired condition is sensed; a sump pump for normally maintaining a liquid below a predetermined level; an electric motor connected to said sump pump for operation thereof; means for connecting said electric motor to a source of electric energy; one of said condition sensing means including an actuator coupled to its respective switch and float means on said actuator for opening said switch in response to said liquid rising about said predetermined level; a switch operator coupled to said relay coil and adapted to be actuated upon de-energization of said coil; a warning circuit including a battery, a normally open electrical switch connected in series with said battery, means coupling said normally open switch with said switch operator for closing of said normally open switch upon de-energization of said relay coil, a warning device connected in series with said battery for giving a signal when said relay coil is de-energized either by the failure of said alternating current source or by the actuation of one of said condition monitoring devices, a manually operable testing switch connected in series with said battery and in parallel with said normally open switch for checking said battery and said warning device, and a disabling switch connected in series with said battery for opening said warning circuit when said sensing circuit is disconnected from said alternating current source.

References Cited by the Examiner

UNITED STATES PATENTS

| | | | |
|---|---|---|---|
| 470,722 | 3/1892 | Tregoning | 340—251 |
| 2,475,356 | 7/1949 | Meschter | 340—248 |
| 2,509,027 | 5/1950 | Zimmermann | 340—253 X |
| 2,807,318 | 9/1957 | Evans et al. | 340—213 X |
| 2,903,681 | 9/1959 | Robbins. | |
| 2,922,147 | 1/1950 | Bredesen | 340—227 |
| 2,971,186 | 2/1961 | Ripepi | 340—276 |
| 2,980,897 | 4/1961 | Meszards | 340—248 |
| 3,010,098 | 11/1961 | Pomeroy | 340—214 X |

NEIL C. READ, *Primary Examiner.*

D. K. MYER, *Assistant Examiner.*